April 6, 1965 A. W. BROWN 3,176,854
BOOM SUSPENSION SYSTEM
Filed March 14, 1963 3 Sheets-Sheet 2
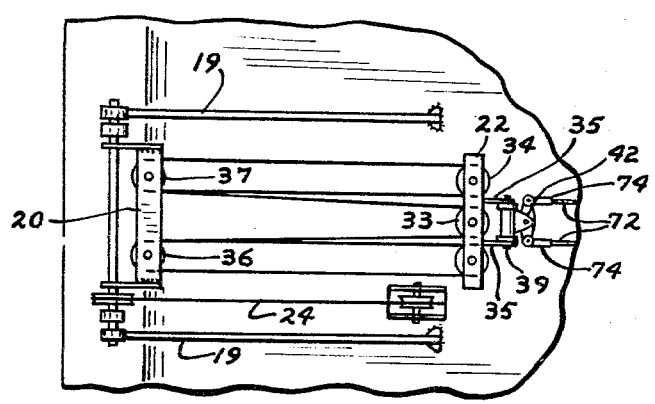
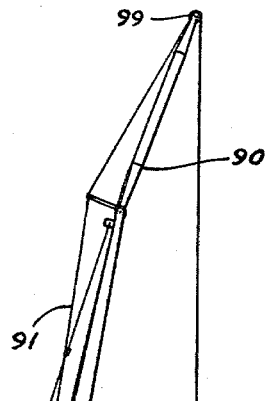
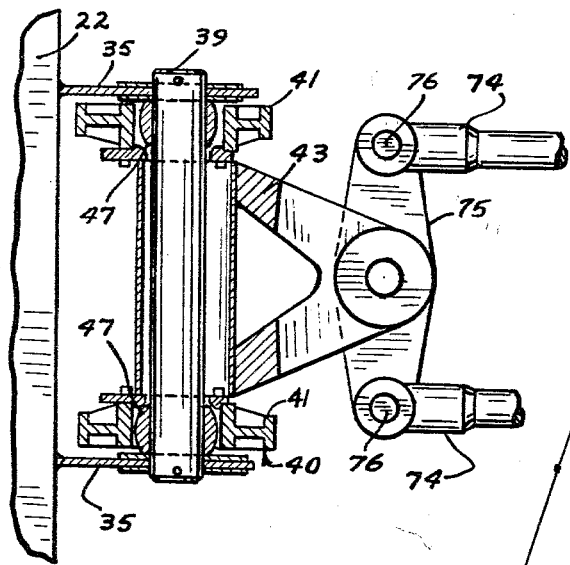
INVENTOR.
ARCHER W. BROWN
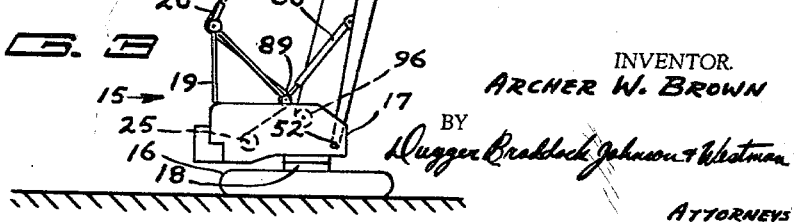
ATTORNEYS

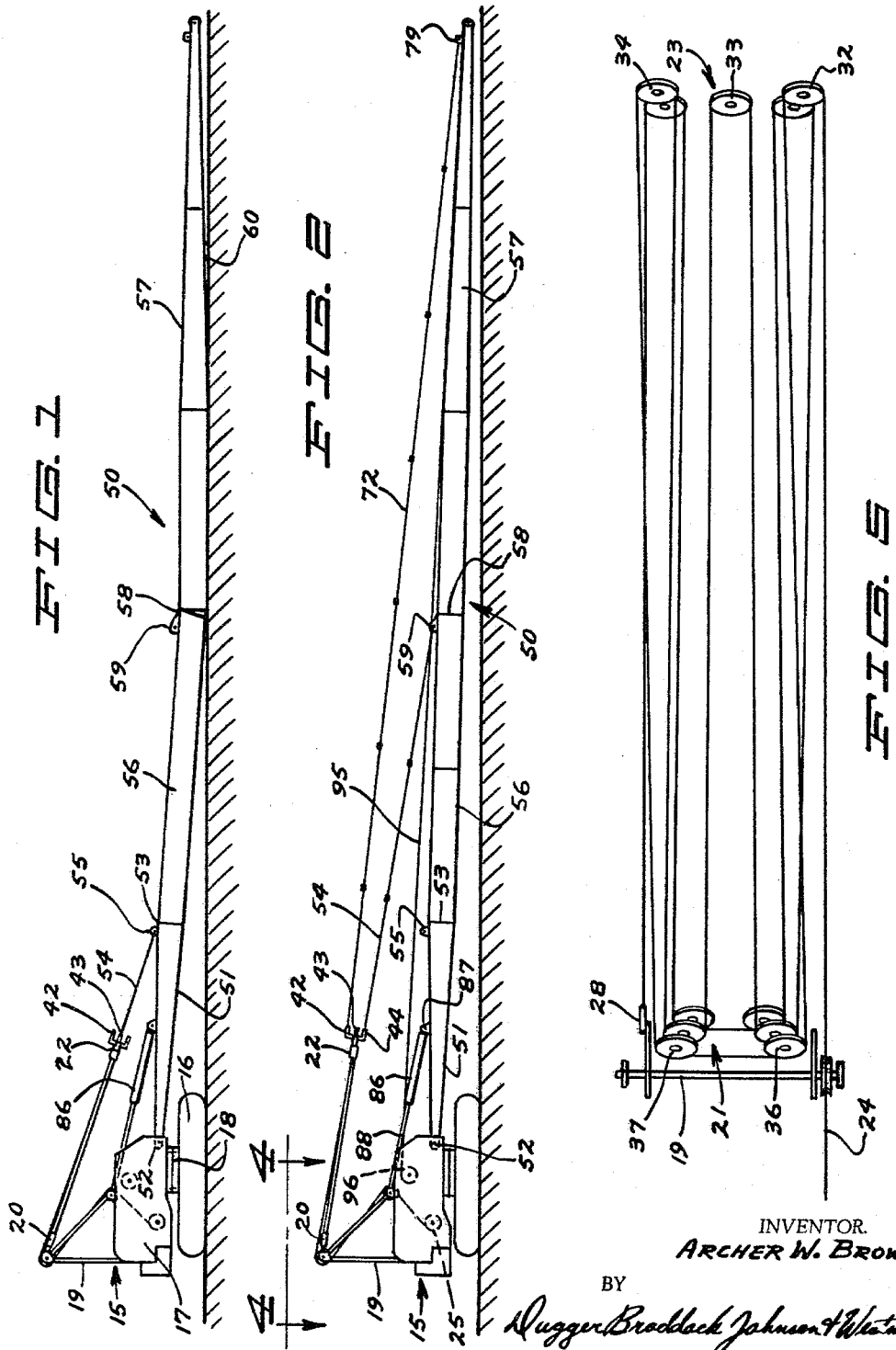

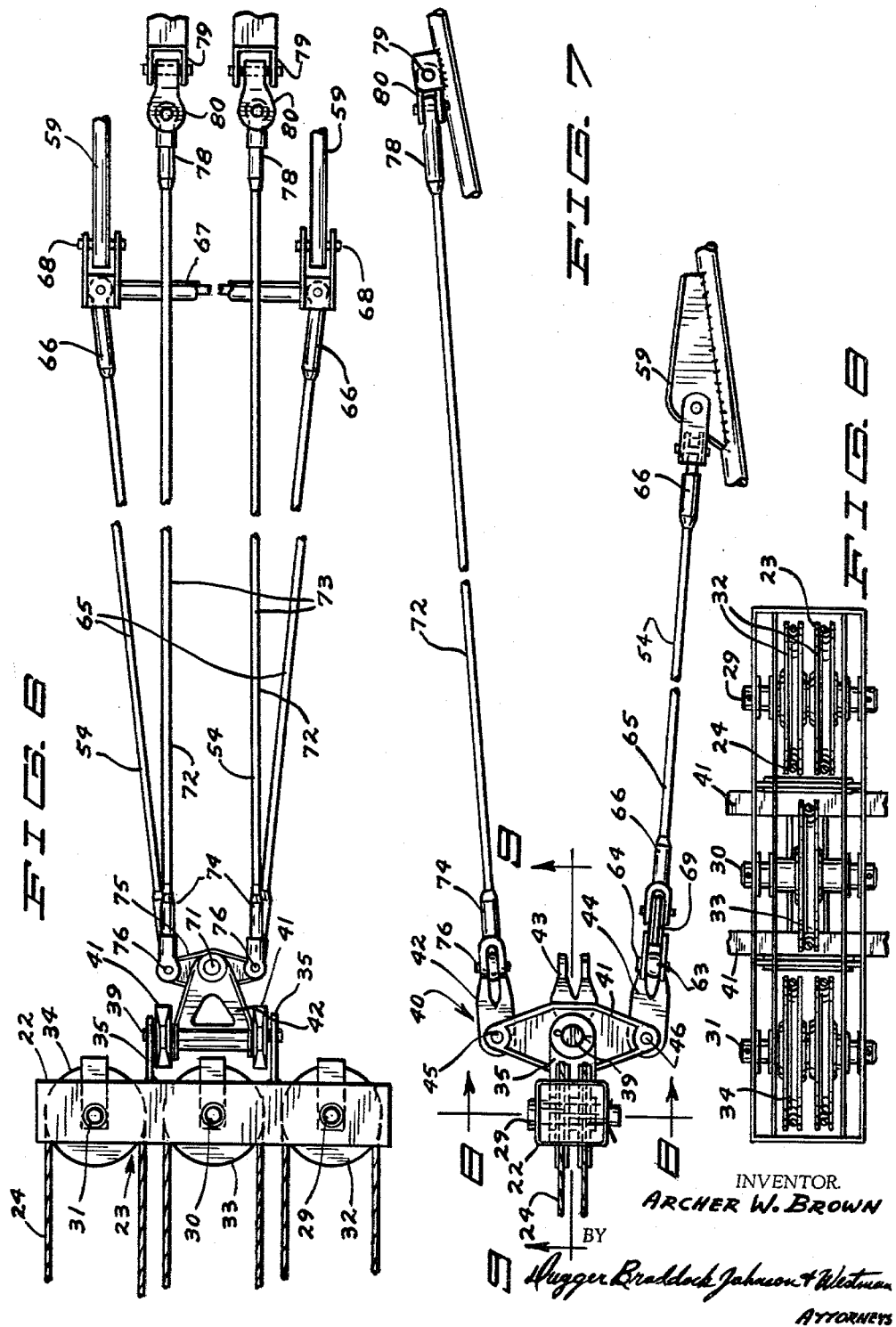

United States Patent Office

3,176,854
Patented Apr. 6, 1965

3,176,854
BOOM SUSPENSION SYSTEM
Archer W. Brown, Minneapolis, Minn., assignor to American Hoist & Derrick Company, St. Paul, Minn., a corporation of Delaware
Filed Mar. 14, 1963, Ser. No. 265,097
8 Claims. (Cl. 212—144)

The present invention has relation to boom suspension systems and more particularly to a suspension system for use on long booms for cranes or similar devices which exerts an equal lifting force at two longitudinally spaced points on the boom in order to minimize bending of the boom.

In the use of cranes with extremely long booms there is a considerable amount of sag in the center of the boom if the lifting force is applied to the boom at only one point. In an attempt to eliminate the sag in the center of the boom it has long been the practice to use what is known in the trade as a "belly line". The belly line is a device constructed by taking two or more parts of the boom suspension cables or reeving and separate them from the outer connection or bail which is attached to the boom pendants. These parts of the control cable are then tied through suitable sheaves directly to some intermediate point of the boom. Thus when the suspension reeving is run to lift or lower the boom, a force is exerted in the center of the boom through active parts of the boom suspension reeving.

Use of a "belly line" has a number of disadvantages. It tends to bow the boom upward when it is in working position. The load exerted through the boom control cable is not equal or proportional to that exerted through the pendants attached to the outer end of the boom. It is very difficult to change the boom length when using a belly line since it involves spooling and unspooling the cable on the boom control drum through the boom suspension reeving.

The device of the present invention, in the form as disclosed, eliminates the necessity of directly utilizing the suspension or control cable of the crane forming it into a belly line. In the present device, as shown, two sets of pendants are used for raising the boom. The upper set is attached near the tip of the boom while a lower set is attached at some intermediate point near the center of the boom. The two sets of pendants are then attached at opposite ends of an equalizing arm, which in turn is controlled with the boom suspension cables. The equalizing arm is mounted on a substantially horizontal pivotal axis at the center thereof so that as tension increases on one set of pendants it is transferred through the equalizing arm to the other set of pendants, thereby compensating for any unequal load and preventing bending or sag of the boom.

If desired, the equalizer arm can be mounted so that one of the sets of pendants has a greater mechanical advantage than the other and the amount of tension in the two sets of pendants can thus be different, being proportional to their respective lever arms.

Utilizing a boom suspension system of the present invention a 320 foot boom with an 80 foot jib has been self-erected. This boom is considerably longer than any that have been able to be self-erected previous to this time. Long booms, of course, are invaluable in use in construction of high buildings, building bridges over deep ravines and similar application.

It is an object of the present invention to present a boom suspension system which applies a lifting force to a boom at two longitudinally spaced points on a boom without changing the boom control reeving.

In the drawings,
FIG. 1 is a side elevational view of a crane having a boom suspension system made according to the present invention illustrated with the boom partially installed thereon;
FIG. 2 is a side elevational view of the device of FIG. 1 after the boom has been assembled and the pendants for controlling the boom are in place;
FIG. 3 is a side elevational view of the device of FIG. 2 illustrated with the boom in working position;
FIG. 4 is a fragmentary enlarged top plan view of the boom suspension and control cables taken as on line 4—4 in FIG. 2;
FIG. 5 is a schematic representation of the reeving used for the boom control cable of the present invention;
FIG. 6 is a fragmentary enlarged top plan view of the boom pendants and attaching mechanism used with the boom suspension system of the present invention, with parts in section and parts broken away;
FIG. 7 is a fragmentary side elevational view of the device of FIG. 6;
FIG. 8 is a sectional view taken as on line 8—8 in FIG. 7; and
FIG. 9 is a sectional view taken as on line 9—9 in FIG. 7.

Referring to the drawings and the numerals of reference thereon, a crane illustrated generally at 15 includes a drive or ground propulsion unit 16 which, as shown, is constituted as a crawler type but could be any of the commonly known drives for cranes. A boom base 17 is rotatably mounted on suitable structure 18 with respect to the drive unit and houses a power unit (not shown) and other equipment for controlling the crane boom. An upper frame 19 is fixed to the crane base and supports a first sheave bail 20 which rotatably mounts a plurality of sheaves illustrated generally at 21 in FIG. 5. A second bail assembly 22 rotatably supports sheaves illustrated at 23 in FIG. 5. A boom control cable 24 extends from a control drum 25 mounted on the base 17 over suitable guide sheaves and is reeved between the sheaves 21 and sheaves 23 as shown schematically in FIG. 5.

Referring specifically now to FIG. 6 it can be seen that second bail 22 houses three pins 29, 30 and 31, respectively. The pins 29, 30 and 31 in turn are used to rotatably mount the group of sheaves indicated generally at 23. As can be seen in FIG. 8, pin 29 has a pair of first outer sheaves 32 rotatably mounted thereon. Pin 30 has a center sheave 33 rotatably mounted thereon and pin 31 has a pair of second outer sheaves 34 mounted thereon.

The boom control cable 24 runs from the guide sheaves and is first threaded over an upper one of the first outer sheaves 32 on bail 22; thence to an upper one of a third set of sheaves 36 in bail 20. The cable is then threaded over to the upper one of a fourth set of sheaves 37 in bail 20; thence to an upper one of second outer sheaves 34 in bail 22. The control cable is then run back to a center one of the sheaves in fourth sheave group 37; thence back to center sheave 33; thence back to a center one of the sheaves in third sheave group 36 on bail 20; thence to the lower one of first outer sheaves 32; thence back to the lower one of the sheaves in third group 36; thence to the lower one of the sheaves in fourth group 37; and thence to the lower one of second outer sheaves 34. The cable 24 is then dead ended on bail 20 as at 28.

By threading the cable 24 in this manner, using two groups of three sheaves each in bail 20 and three separate sheave groups in bail 22, the load is applied symmetrically to the bail 22.

The bail 22 has a pair of substantially parallel ears 35, 35 fixedly attached thereto and extending forwardly therefrom. A cross pin 39 extends between the ears. A load equalizer arm assembly illustrated generally at 40 is pivotally mounted on cross pin 39. The equalizer arm assembly is comprised of two substantially parallel arm members 41, 41 which are rotatably mounted through anti-friction bearings 47, 47 on pin 39 adjacent opposite ones of the ears 35, 35. The arm members 41, 41 are spaced apart by an upper connector bracket 42, a center connector bracket 43 and a lower connector bracket 44. The connector brackets 42 and 44 are identical in construction. The upper connector bracket 42 is rotatably mounted on an upper connector pin 45 which in turn is mounted between upper end portions of the arm members 41, 41. The center connector bracket 43 is fixedly mounted between the arm members 41, 41 and will rotate about pin 39 with the arms. The center connector bracket 43 is thus connected directly to the bail 22 through ears 35 and pin 39. The lower connector bracket 44 is rotatably mounted on a pin 46 which in turn is mounted in the lower end portions of arms 41, 41.

A long boom assembly 50, which is mounted onto the crane 15 is composed of several sections. When the long boom is to be mounted onto the crane, a base or inner boom section 51 is pivotally mounted as at 52 to the crane base 17. The inner section extends to a junction 53. A pair of lower pendants 54, 54 are connected to opposite ends of a load arm 63 that in turn is connected to the center connector bracket 43. The outer ends of pendants 54, 54 are fastened to ears 55 at the outer end of the inner section 51 of the boom. A second section 56 of the boom is pinned at junction 53 at the top side of the boom. The boom control cable 24 is tensioned to exert a force on the lower pendants 54 and thus raise the inner section 51 and the inner end of the second section 56 of the boom. The bottom edges of the boom at junction 53 then come together and are pinned to make a rigid unit. The second section is positioned adjacent an outer section 57 of the boom at junction 58. The lower pendants 54 are then lengthened by using suitable extension members such as those illustrated in FIG. 2 and the outer ends of the pendants connected to center ears 59 adjacent junction 58. The load arm 63 and the pendants 54 are left attached to the center bracket 43 until the three sections of the boom have been lifted sufficiently so that the lower edges of the boom at junction 58 can be joined together. To aid in making the bom connection at junction 58 a block 60 can be placed under the outer section and when the boom is raised the outer section will be partially supported on the block until the entire boom is made rigid. After the entire boom assembly is made into a rigid continuous structure the load arm 63 is moved to lower connector bracket 44 on the equalizer arms 41, 41 and the arm is pinned as at 64 to the lower bracket. As perhaps can be best seen in FIGS. 6 and 7, each of the lower pendants is comprised as a cable 65 having coupling clevises 66, 66 at opposite ends thereof. The outer clevises 66, 66 of the lower pendants are attached to a spreader bar assembly 67 which in turn is pivotally attached to the ears 59, 59 on the boom with pins 68, 68. The ears are attached at opposite edges of the boom.

The upper clevises 66, 66 of the lower pendants 54 are each attached to its respective end of load arm 63 through a removable link 69. The removable link 69 is utilized to make the unit adaptable for different boom lengths, as will be more fully explained later.

A pair of upper pendants 72, 72 are comprised as cable 73, 73 having inner clevises, 74, 74 and outer clevises 78, 78 attached thereto. The inner clevises of upper pendants 72 are pivotally mounted to opposite ends of load arm 75 through pins 76. The load arm 75 in turn is pivotally mounted to the upper connector bracket 42. The outer ends of pendants 72, 72 are connected through outer clevises 78, 78 to connection clevises 80, 80 which in turn are pivoted to ears 79, 79. The ears 79 are fixedly attached to the boom at the outer end thereof.

When the long boom 50 is to be raised, a force is applied through boom control cable 24. This force is transmitted through the sheaves 21 and 23 and second bail 22 to ears 35, 35 and then to pin 39. Pin 39 in turn transfers this load to the arm members 41, 41 and through the upper and lower connector brackets 42 and 44 to the upper and lower pendants. The arm members 41, 41 are free to pivot and, as shown, with the connection points of the boom upper and lower pendants 72 and 54, respectively, spaced an equal distance outwardly from pin 39, the load applied through the pin 39 will be transferred equally to the upper and lower pendants. In addition, the load arms 75 and 63 insure that the load between the pendants of each pair is equal.

The long boom can be raised and controlled with cable 24 as there is a load connection at the center thereof to prevent the boom from bending excessively and buckling.

A telescoping boom back stay has an outer section 86, which is pivotally mounted as at 87 to the inner section 51 of the boom. An inner back stay section 88 is slidable into the outer section 86 and is pivotally mounted at 89 on top of the base 17. The sections are extended when the boom is being raised. Once the boom is in its erected position the telescoping sections are fixed with respect to each other. A jib assembly 90 is mounted at the outer end of the boom. The jib assembly 90 is angularly fixed in relation to the boom through the use of a jib back stay line 91 that can be adjusted in length to suit particular circumstances. The jib could be angularly adjusted with respect to the boom, if desired.

A load line 95 is controlled from a load drum 96 on the crane base and is threaded through suitable guide sheaves and over an end sheave 99 on the jib. A load line 95 has a downwardly extending length 97 which is used to support a load 98.

When load is raised by the load line 95 and drum 96 the force for lifting this load is transferred through the upper pendants 72 and the lower pendants 54 back through the equalizer arms 41, 41 to the boom control sheaves and bails. The equalizer arms 41, 41 receive the loads from the pendants and will pivot about pin 39 so that the loads in each of the pairs of pendants is equal. The arms 41, 41 pivot a great deal in use largely due to the fact that the longer lengths of the upper pendants make them stretch a considerable amount more than the lower pendants 54.

When long booms are used, the lower pendants are lengthened slightly with the links 69. If shorter booms are used, where the length differential between the upper and lower pendants is not as great, the links are removed and the clevises 66, 66 are connected directly to the load arm 63.

The advantages of this system are many. The outer half of the boom is subjected to the compressive forces exerted by only two pendants. The boom outer portion can be much lighter than the inner portions, which must resist the force of all four pendants. The reduction of weight at the outer end of the boom is a vital consideration, particularly when the boom is self-erected.

When the boom is being erected, the vertical lift of the tension forces of the lower pendants is sufficient to completely overcome the dead weight bending of the boom thereby keeping it straight and preventing buckling.

With two pairs of pendants used for supporting the boom, much lighter cables can be used on the upper pendants than previously. This in turn reduces the total weight on the boom and makes the long boom easier to raise to working position. The lighter, more efficient cables are much easier to handle.

If booms of different length are to be utilized the advantages of the present invention over the conventionally used belly line is even greater. The length of the pendants can be changed extremely easily when the length of the boom is changed. The entire sheave control cable is reeved independently of the pendants and there is no need to unreeve a large amount of cable from the control drum or rewind cable during the changing of boom lengths, which is laborious and time consuming. The control cable for the boom can be a standard length regardless of the changes in lengths of the pendants and booms.

It should be noted that while the equalizer arms 41, 41 are illustrated so that there is equal load between the upper and lower pairs of pendants the pivot points of the arm members 41, 41 could be changed so that the load in the pairs of pendants could be proportionally different. For example, by moving the pivot point of the arm members 41, 41 one third of the way between the two ends, the load could be twice as great in the upper pendants, if desired.

What is claimed is:

1. The combination with a crane base, a boom mounted on said base for pivotal movement about a substantially horizontal axis, hoist means for raising said boom, upper and lower pendants, each having outer and inner ends, said outer ends being pivotally mounted to said boom in spaced relationship to each other along the longitudinal dimension of said boom, an equalizer arm having spaced first and second arm ends, means to mount said equalizer arm to said hoist means including a substantially horizontal pivot positioned between said spaced arm ends, and means for pivotally attaching said inner ends of said upper and lower pendants to said first and second arm ends, respectively.

2. The combination as specified in claim 1 wherein said hoist means includes a bail, a plurality of sheaves rotatably mounted on said bail, a cable on said sheaves for controlling movement of said bail, and a pair of outwardly extending ears fixed to said bail, said equalizer arm being pivotally mounted on a pin extending between said ears.

3. The combination as specified in claim 1 wherein said hoist means comprises a cable, a drum for controlling said cable, an inner sheave bail mounted on said crane, a plurality of sheaves rotatably mounted on said inner bail, an outer bail, a plurality of sheaves rotatably mounted on said outer bail and positioned symmetrically about the center line of said bail parallel to the axes of said sheaves, said cable being reeved between the sheaves of said inner and outer bail so that a symmetrical load is applied to said outer bail with respect to said center line.

4. The combination with a crane base, an elongated boom mounted on said base for pivotal movement about a substantially horizontal axis, and hoist means adjacent said base for raising and lowering said boom, of: an equalizer arm, means to pivotally mount said equalizer arm to said hoist means about a substantially horizontal axis, said equalizer arm having arm portions extending in opposite directions from said pivotal axis, first and second load arms, means for pivotally mounting each of said load arms to one end of said equalizer arm for pivotal movement about a substantially vertical axis lying in a plane at substantially right angles to the boom axis, a first pair of pendants attached to an outer end of said boom and to opposite ends of said first load arm, and a second pair of pendants attached to a middle portion of said boom and attached to opposite ends of said second load arm.

5. The combination as specified in claim 4 wherein said means for pivotally connecting said load arms to said equalizer arm are comprised as brackets pivotally mounted to said equalizer arm for movement about substantially horizontal axes.

6. The combination with a crane, an elongated boom mounted on said crane for pivotal movement about a substantially horizontal axis, cable control means for raising and lowering said boom, said cable control means including an outer sheave bail, of: a pair of ears fixedly mounted to said outer sheave bail, a pin mounted between said pair of ears, a pair of equalizer arms rotatably mounted on said pin, and portions of each of said equalizer arms extending in opposite directions from said pin, upper and lower connector brackets pivotally mounted between said equalizer arms about substantially horizontal axes each spaced from the pin axis on opposite sides thereof, a center bracket fixedly mounted to said equalizer arms, upper and lower load arms, means for mounting said upper and lower load arms to said upper and lower connector brackets, respectively, about axes at right angles to said pin axis, a pair of pendants attached to opposite ends of said upper load arm at first ends thereof and attached to an outer end of said boom at second ends thereof, and a pair of lower pendants attached to opposite ends of said lower load arm at first ends thereof and attached to a middle portion of said boom at second ends thereof.

7. The combination as specified in claim 6 and a separate removable link extending between each of said lower pendants and its respective end of said lower load arm.

8. The combination as specified in claim 6 wherein said equalizer arms are mounted on anti-friction bearings.

References Cited by the Examiner

UNITED STATES PATENTS 2,609,940 9/52 Grundrig _____ 212—144
2,972,199 2/61 Learmont _____ 212—144

FOREIGN PATENTS 442,830 2/36 Great Britain.

SAMUEL F. COLEMAN, *Acting Primary Examiner.*

ANDRES H. NEILSEN, *Examiner.*